United States Patent [19]

Abbiate et al.

[11] Patent Number: 5,247,546
[45] Date of Patent: Sep. 21, 1993

[54] METHOD AND APPARATUS FOR AUTOMATIC FUNCTIONAL SPEED SETTING OF A DATA CIRCUIT TERMINATING EQUIPMENT

[75] Inventors: Jean-Claude Abbiate, La Gaude; Lucien Quenel, Nice, both of France

[73] Assignee: International Business Machines Corporation, Armonk, N.Y.

[21] Appl. No.: 719,431

[22] Filed: Jun. 24, 1991

[30] Foreign Application Priority Data

Jun. 29, 1990 [EP] European Pat. Off. ......... 90480092.7

[51] Int. Cl.$^5$ .......................... H04L 23/00; H04J 3/22
[52] U.S. Cl. ........................................ 375/121; 370/84
[58] Field of Search .......................... 375/7, 8, 17, 121; 370/84

[56] References Cited

U.S. PATENT DOCUMENTS

| | | |
|---|---|---|
| 3,747,074 | 7/1973 | Schulze . |
| 4,168,401 | 9/1979 | Molleron et al. ............... 370/84 |
| 4,229,815 | 10/1980 | Cummiskey ..................... 370/84 |
| 4,485,468 | 11/1984 | Slana ............................... 370/84 |
| 4,756,007 | 7/1988 | Qureshi et al. .................. 375/8 |
| 4,887,083 | 12/1989 | Kosugi et al. ................... 375/17 |

FOREIGN PATENT DOCUMENTS

0292691 11/1988 European Pat. Off. .
8706788 11/1987 World Int. Prop. O. .

OTHER PUBLICATIONS

Patent Abstracts of Japan, vol. 8, No. 21 (E-224)(1458) Jan. 29, 1984, & JP-A-58 182330 (Ricoh K.K.) Oct. 25, 1983.
Patent Abstracts of Japan, vol. 10, No. 283 (E440(2339) Sep. 26, 1986 & JP-A-61 101138 (Hitachi Ltd) Apr. 20, 1986.

*Primary Examiner*—Curtis Kuntz
*Assistant Examiner*—Vijay Shankar
*Attorney, Agent, or Firm*—Edward H. Duffield

[57] ABSTRACT

A system implemented in a Data Circuit Terminating Equipment (DCE), interfacing between a user's data processing equipment and a digital network, comprises a detector for generating an Analog Carrier Detect (ACD) DCE internal signal as well as an Analog Squared Data (ASD) DCE internal signal, and an ASD WIDTH ERROR DCE internal signal from the flow of data transmitted by the network and received on the DCE receive line. The system also comprises new circuitry for generating a Lack of Receiver Timing (LRT) DCE internal signal, a Block Error ASD DCE internal signal, and a Block Error Bipolar (BEBIP) DCE internal signal. Finally, the system includes a logical decision process which leads the DCE to automatically adjust its functional speed to the rate of data transmitted by the network and received on DCE receive line. The process includes setting the DCE to the highest possible functional speed, and for that particular speed, checking all four of the ACD, LRT, BEASD and BEBIP DCE internal signals; and if one of the checkings is not satisfactory, setting the DCE to the next possible lower speed, or if all checkings are satisfactory, stopping the process as the DCE is ready to work.

6 Claims, 4 Drawing Sheets

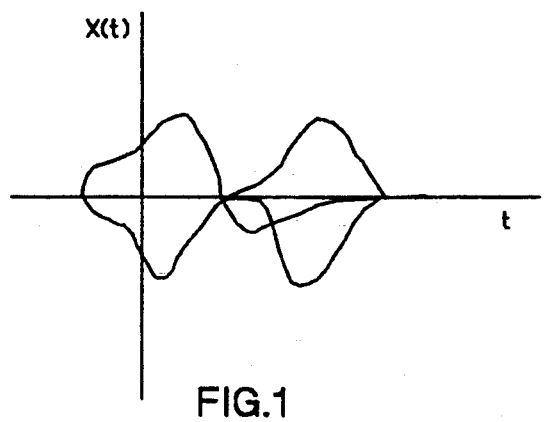
FIG.1
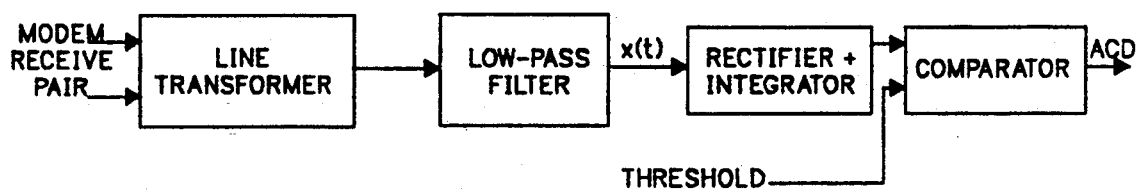
FIG.2
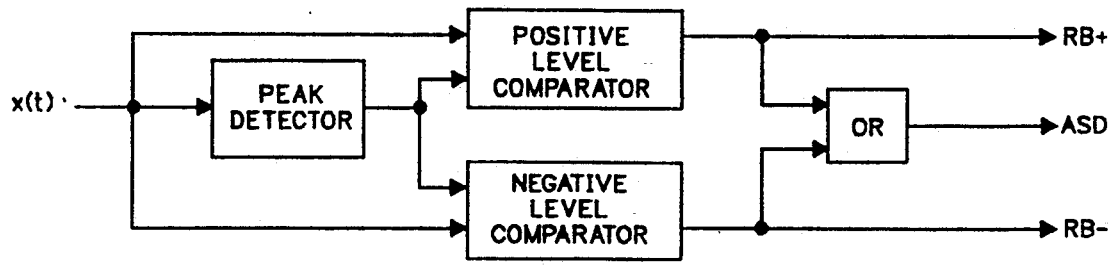

METHOD AND APPARATUS FOR AUTOMATIC FUNCTIONAL SPEED SETTING OF A DATA CIRCUIT TERMINATING EQUIPMENT

FIELD OF THE INVENTION

This invention generally relates to Data Circuit Terminating Equipment, and more specifically to a system for automatically setting functional speed of a baseband modem according to the rate of data sent by the network to which the modem is hooked.

PRIOR ART

Any communication network allows two or several distant end-users to exchange data; an interface is thus provided to each end-user at which data are exchanged between the network and the user's equipment. Data sent by one user's equipment at one end are then internally transported by the network to a destination user at another end. While internal means for transportation are usually transparent for the end-users, those users definitely have to comply with certain standards and specifications provided in the network guidelines for operation in order to be able to attach to the user-network interface Such an interface consists quite often nowadays in two twisted pairs of metal wires. This is the case for example for Digital Data System network (DDS network, which interface specifications reside in Publication 62710) in the United States or for Integrated Services Digital Network (ISDN, interface specifications in CCITT I-series) worldwide. One pair of wires is then dedicated to carrying data in the network to the user (it is the so-called 'receive pair' on the user side) while the other pair is free for the user's equipment to send data to the network ('transmit pair').

In the interface specifications are also mentioned the electrical characteristics of the signals to be found on each pair of wires. The very meaning of a stream of those signals, that is to say the correspondence between those electrical signals and the binary data exchanged between the network and the user, is also standardized. A widely used standard for digital networks, is the so-called 'HDBn bipolar code'. Such a code is 'bipolar' (or 'AMI':Alternate Mark Inversion) as three levels of electrical energy can be found for the signals on each metal wire pair: a positive pulse, a negative pulse and a 'zero level' (no energy). 'HDBn' stands for the type of correspondence adopted between binary data and the three signal levels, their transitions, the interpreted code violations, etc. . .

Finally, the data exchange rate over the metal wires is also given in the user-network interface specifications. It could be constant as in ISDN Basic Rate Interface (192 kbps) or ISDN Primary Rate Interface (1.544 Mbps in the United States, 2.048 Mbps in Europe), or could range for example from 2400 bps to 56000 bps as in DDS network.

To hook data processing equipment to the network, each end-user will need a Data Circuit Terminating Equipment (DCE), also called 'baseband modem', allowing for conversion of binary data as handled by data processing equipment, into three-level signals as required at the user-network interface, and vice-versa. A baseband modem does not modulate or demodulate a carrier signal over an analog line the way a 'true' modem does. Still, the single word 'modem' will be used in the following description, as being well-known for the man skilled in the art, as also designating the DCE needed by the user to interface between data processing equipment and the digital network.

At installation time on a network such as DDS network, the functional speed for each modem needs to be set according to the exchanged rate at the user-network interface specified by the user at line subscription time (depending on the input/output performance of his data processing equipment) within a range of network supported rates (2400 bps, 4800 bps, . . . up to 56000 bps). Two modems at each end of the network must be set to the same speed in order to communicate. Moreover, the owner of hundreds of modems located in different data processing centers, but hooked to the same communication network, must ensure that all modems are set to an identical speed. The setting is performed either thru switches or a terminal hooked to a dedicated entry port of the modem, but always requires manual intervention at installation time.

After installation is completed, it might be desirable as input/output performance of user's data processing equipment improves, and/or the network operating company is able to support higher data exchange rates at the user-network interface (a line was provided to the user which might not be the best available type at installation time, but which the operating company might propose the user to upgrade later), to increase communication speed, so as to improve overall network usage efficiency and cost. The owner of hundreds of modems located in different data processing centers will initiate the upgrading by asking the operating company to increase communication speed at all provided network interfaces, and will then be confronted with the problem of upgrading the functional speed of hundreds of impacted modems installed all over in the 'field'. An extremely costly intervention from the maintenance people is then needed on-site to set a new speed on all modems.

There thus can be identified the need for modems in which functional speed could be either set remotely (for example by a 'control' modem sending orders thru the network to 'tributary' modems), or automatically adjusted by the modem itself to the rate of data sent by the network as received on the modem's receive pair.

European Patent Application 0 154 565 discloses a modem including means for selecting its functional speed depending on information signals sent by a remote controlling modem. This is made possible by the two modems reserving part of the total bandwidth provided end-to-end by the network for such information signals; it is as if data and information signals were transported on two different physical channels. However, networks such as DDS network for example, do not provide an end-to-end bandwidth, but a guaranteed data throughput. Data received by those networks at the user-network interface are interpreted, re-formatted by means specific to the networks' operating companies, then internally forwarded to the destination interface, and there formatted again in compliance with the user network specifications. Thus, no technique like the one described in the European Application cited above is possible anymore for remotely setting functional speed of a modem.

OBJECTS OF INVENTION

It is therefore an object of the invention to provide a system which, when implemented in a modem, allows self-adaptation of functional speed of the modem according to any identified incoming data rate at the user-network interface, within a range of preassigned rates supported by the network.

BRIEF SUMMARY OF THE INVENTION

According to the invention, modem functional speed will first be set corresponding to the highest data rate available within the range of preassigned rates. Analyzing of the signals received from the network will be Performed at that speed; if the result of analysis is not satisfactory, the next functional speed corresponding to the next lower available rate at the user-network interface will be automatically tried. If no functional speed is finally successfully found, the modem is put in a non-operational mode, waiting for a manual intervention. Otherwise, the modem is left running and operational at the successfully tried speed.

The invention comprises several means allowing for analyzing of the signals received from the network and means for detecting the presence of energy on the receive line at the user-network interface. Also, given that three-level signals can be found according to a bipolar code on that receive line, other means allow for the generation of a square pulse modem internal signal, each square pulse corresponding to each one of the positive or negative signals detected on the receive line. According to the invention, analyzing of the signals received from the network involves checking for the following, at each tried functional speed:

Energy present on the receive line.

No lack of generated square pulse modem internal signals.

Not too many of these pulses that have a too short or too large width.

Not too many violations of the bipolar code on the receive line.

Any failed test or check will prove a mismatch between the data incoming rate and the current functional speed the modem is set for.

The objects, features and advantages of the invention will be better understood from the following detailed description with reference to the attached drawings:

BRIEF DESCRIPTION OF DRAWINGS

FIG. 1 shows a typical waveform at the user-network interface as received on the modem side, after some low-pass filtering.

FIG. 2 recalls principles for the generation of Analog Carrier Detect (ACD) signal.

DETAILED DESCRIPTION OF PREFERRED EMBODIMENT

Figure 3:
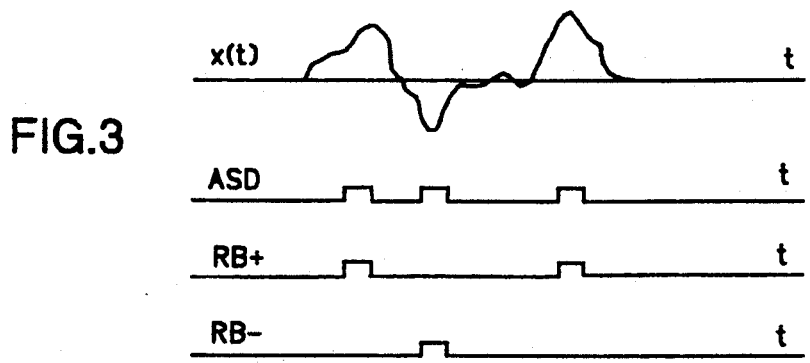
FIG. 3 recalls principles for the generation of Analog Squared Data (ASD) signal from the flow of received data, as well as Received Bit Positive (RB+) and Received Bit Negative (RB−) signals.

Although the invention will be described in a preferred embodiment where the associated modem is hooked to a DDS network, it will be obvious for the man skilled in the art to extend implementation of the invention into a modem hooked to any kind of digital network providing the following features:

Baseband connection between the modem and the user-network interface.

Bipolar Code used at interface (it is to be noticed that in the event a Biphase Code such as Frequency Shift Keying or Differential Frequency Shift Keying could be used such as a Biphase Code which could be easily transformed into Bipolar Code by means well-known to the man skilled in the art).

Data exchange rate at the interface is in a range of predefined rates as supported by the network Italian network CDN or Canadian network DATAROUTE for example provide those features.

Setting a modem's functional speed means setting all of its internal clocks so as to have the modem perfectly work when attached to a user-network interface at which data exchange rate corresponds to that functional speed.

The setting thus affects all parts of the modem, including the 'transmit part' (which deals with the transmit pair of wires) and the 'receive part' (receive pair) knowing that internal clocks for both those parts are at the same frequency, and are phase-related.

It will be assumed for sake of brevity that any modem comprises an internal processor capable of ensuring an automatic logical decision process.

Typical pulses as received on the receive pair of the modem after some low-pass filtering (See also FIG. 2) can be seen on FIG. 1. Such a distorted waveform is commonly found despite the quasi perfect signal emitted by the network, due to the transfer function of the line between the actual user-network interface outlet and input of the modem, as well as all kinds of parasitic effects. Nevertheless, one of the quality criteria for a modem will be its ability to handle very distorted waveforms and accurately differentiate between positive pulses, negative pulses and no-energy levels. One of the keys to highly accurate discrimination is the choice in the waveform sampling time as instructed in European Patent Application 0 312 671. In that application, several means are described allowing for analyzing an incoming signal by a modem's receive part and inducing a best choice for signal sampling time. Although setting a modem's functional speed is of no concern in the above application, some of the means described therein are used in the present invention; in particular, the way ASD (Analog Squared Data), RB+ (Received Bit Positive) and RB− (Received Bit Negative) signals are generated is simply recalled in FIG. 3, along with the resulting waveforms. It is granted for the man skilled in the art that an ASD signal provides a square pulse every time a positive or a negative pulse is detected among the modem's incoming data, while RB+ signal provides a square pulse for each positive incoming pulse, and RB− signal for each negative one.

An also very well-known technique is recalled in FIG. 2 with the ACD (Analog Carrier Detect) signal generation. Suffice it to say that this modem's receive pair, and that a positive test (ACD is 'up') is a prerequisite to any further accurate analyzing of incoming data.

Figure 4A:
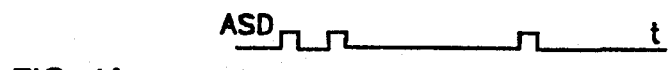
FIGS. 4a and 4b describe means for generation of Lack of Receiver Timing (LRT) signal.
Figure 4B:
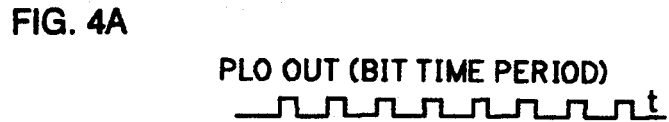
Figure 5:
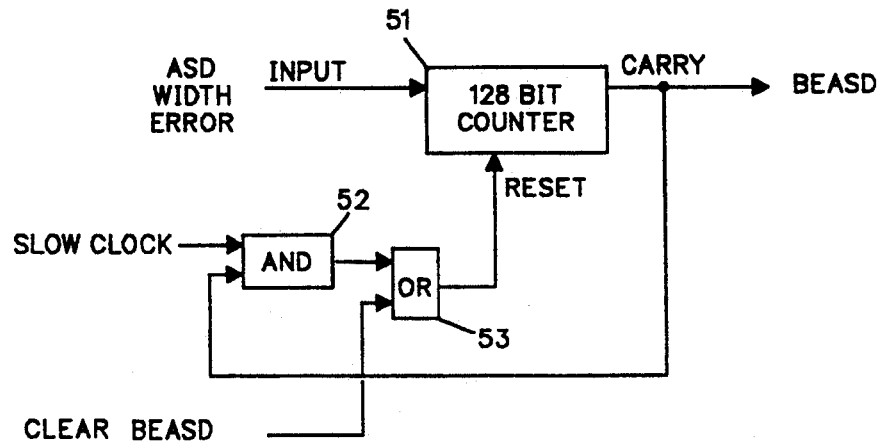
FIG. 5 describes means for generation of Block Error ASD (BEASD) signal.
Figure 6:
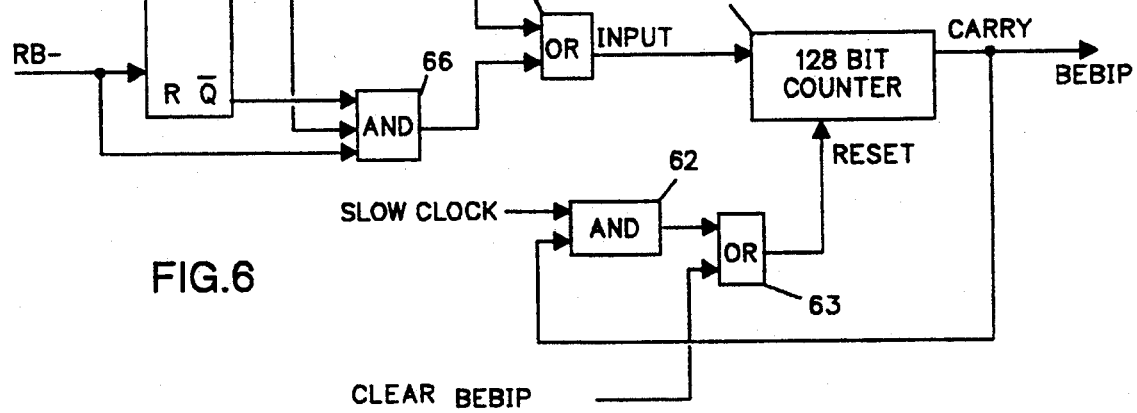
FIG. 6 describes means for generation of Block Error Bipolar (BEBIP) signal.

These recalled traditional means, along with other means which are part of the invention and disclosed with respect to FIGS. 4, 5, and 6, provide inputs for the modem's automatic logical decision process (FIG. 7), which consists in accomplishing an automatic choice of functional speed according to the rate of data transmitted by the network as received on the receive pair of the modem.

ACD value input in particular allows the modem to not start any decision making process unless energy is detected on the modem's receive pair.

FIG. 4 describes means for generation of Lack of Receiver Timing (LRT) signal. These means comprise a conventional 128 BIT COUNTER clocked by PLO OUT signal. This signal whose generation is not detailed here, is provided by means described with regard to page 10 and FIG. 5 in European Patent Application 0 312 671. It is basically a steady clock generated from the combination of the incoming data rate and modem's internal crystal clock, thru a Phase Locked Oscillator, with a bit time period corresponding to incoming data rate. The 128 BIT COUNTER can be reset by any positive pulse of the ASD signal. When the 128 BIT COUNTER counts up to 128, LRT turns 'up'; that is when 128 bit periods have been counted without an ASD signal being positive within the time interval; that is to say no positive or negative pulse has been detected coming from the modem's receive pair within the time interval (modem's Phase Locked Oscillator is 'free running' due to internal crystal clock). Such an event is considered 'abnormal' and the modem's functional speed not adapted to incoming data rate.

FIG. 5 describes means for generation of a Block Error ASD (BEASD) signal. These means comprise a conventional 128 BIT COUNTER 51 clocked by the ASD WIDTH ERROR signal. This signal, whose generation is not detailed here, is provided by means described with regard to page 13 and FIG. 11B in European Patent Application 0 312 671. It is basically a signal which rises when the pulses of the ASD signal generated from incoming data have an either too narrow or too large width (that is to say the PEAK DETECTOR and the LEVEL COMPARATORs of FIG. 3 provide erroneous information due to noise on the line). 128 BIT COUNTER 51 can be reset by any positive pulse at the output of OR gate 53. The CLEAR BEASD lead for example, could be activated by the modem's internal processor or the output of AND gate 52 could become active. When 128 BIT COUNTER 51 counts up to 128, BEASD turns 'up'; that is when 128 pulses of ASD WIDTH ERROR signal have been counted, within less than one period of the SLOW CLOCK (15 seconds for example). Such an event is also considered 'abnormal' and the modem's functional speed is not adapted to the incoming data rate.

FIG. 6 describes means for generation of the Block Error Bipolar (BEBIP) signal. These means comprise a conventional 128 BIT COUNTER 61 clocked by the output signal of OR gate 64. This signal is 'up' each time a violation of the Bipolar Code supposedly used at the interface the modem is hooked to, is detected among incoming data. Described circuits 64 to 67 allow for detection of violation of the simplest code: AMI (a positive pulse is followed by another positive pulse, or a negative pulse is followed by another negative pulse). It is obvious that some other circuitry not described here is necessary to handle more sophisticated Bipolar Codes; however, it remains in the range of the well-known technique for the man skilled in the art. The 128 BIT COUNTER 61 can be reset by any positive pulse at the output of OR gate 63. CLEAR BEBIP lead for example, could be activated by the modem's internal processor or the output of AND gate 62 could become active. When 128 BIT COUNTER 61 counts up to 128, BEBIP turns 'up'; that is when 128 AMI Code violations have been counted within less than one period of the SLOW CLOCK (15 seconds for example). Such an event is finally considered 'abnormal' and the modem's functional speed is not adapted to the incoming data rate.

The above three generated signals (LRT, BEASD, BEBIP) are inputs for the modem's automatic logical decision process (FIG. 7), which results in an automatic choice of functional speed according to the rate of data transmitted by the network as received on the receive pair of wires of the modem. All three inputs together prove to be necessary for the modem to make an accurate choice of its functional speed.

The LRT and BEASD signals provide information on the quality of ASD signal generated from incoming data. A poor quality ASD signal should be discarded as not reliable to make a good functional speed decision. But, when the modem's functional speed is set for example to twice the actual data rate on the receive pair, information provided by LRT and BEASD is not sufficient because those signals will be 'down'. Therefore, the BEBIP signal supplies the necessary complementary information for the automatic choice of functional speed.

Figure 7:
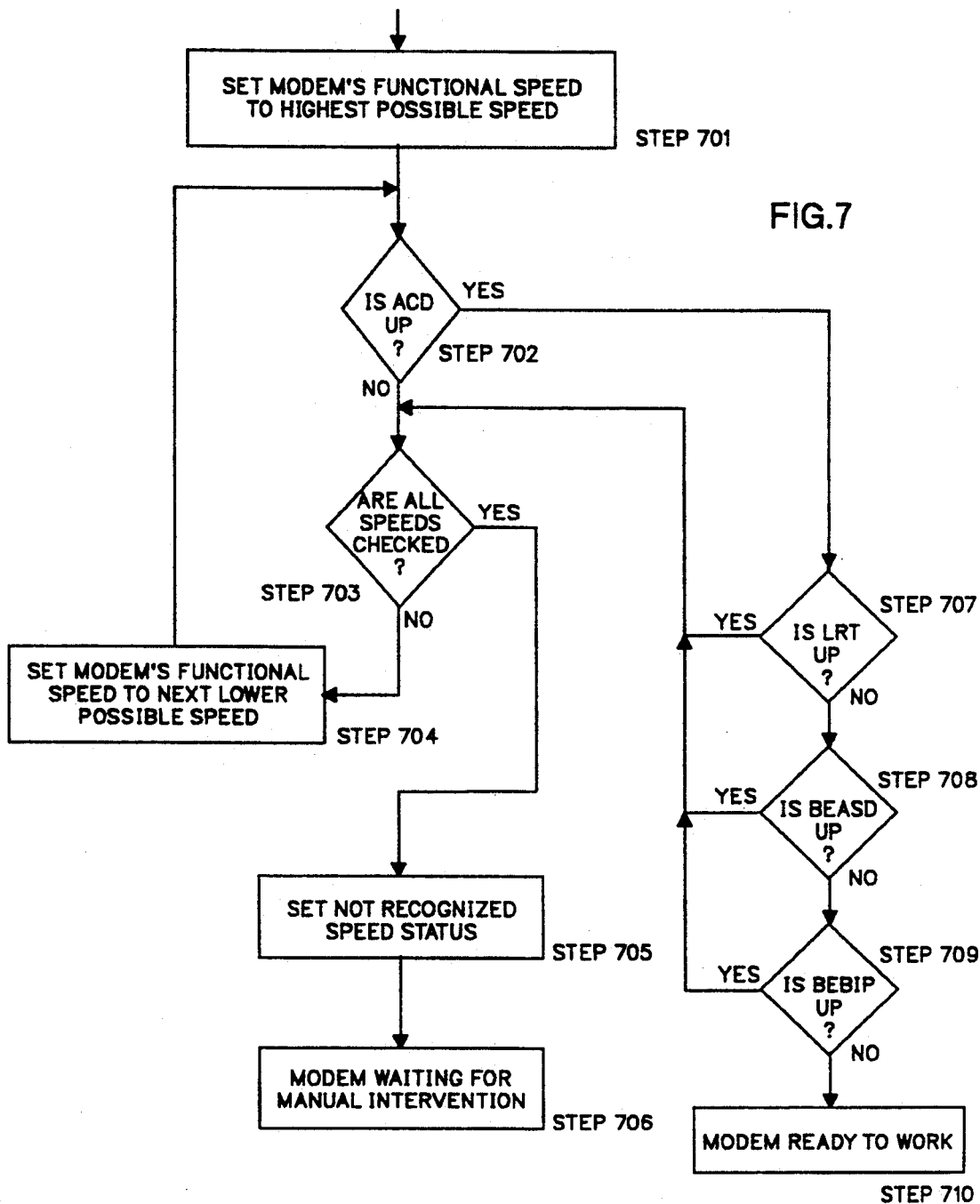
FIG. 7 shows the flowchart for the modem's automatic logical decision process.

FIG. 7 finally shows the flow chart for the modem's internal logical decision process. When the whole sequence is completed, the modem is either ready to work perfectly at the user-network interface it is attached to (step 710), as its functional speed has been automatically set according to the identified rate of data received on the receive pair, or it will be waiting for a manual intervention (step 706), with a 'no recognized speed' status (step 705).

The process starts with step 701 at any power-on sequence of the modem. Step 701 consists in setting the modem's functional speed to the highest speed as supported by the network (56000 bps for DDS); that is to say it involves setting all the modem's internal clocks in order for the modem to be able to work perfectly at the user-network interface it is attached to for the case where the rate of data transmitted by the network would correspond to the highest speed.

With step 702, a checking is performed on the value of the ACD (Analog Carrier Detect) signal. If the ACD is 'down', meaning that the hardware means of the modem have not detected any energy on the line when its functional speed is set to 56000 bps, the next lower functional speed (19200 bps for DDS) corresponding to the next lower possible rate of data as transmitted by the network at the interface will be tried (step 704), providing the possible rates have not been all tried out already (step 703).

If ACD is 'up' at step 702, then a branch is made to value checking of the three other hardware signals as recited above, such as LRT (Lack of Receiver Timing, step 707), BEASD (Block Error Analog Squared Data, step 708) and BEBIP (Block Error Bipolar, step 709). Any 'yes' result for any of those checkings implies a "branch to step 703" and, if possible, the automatic trying of the next lower functional speed.

A 'no' result to each one of these checkings ensures that the rate of data transmitted by the network at the interface has been automatically identified as corresponding to the functional speed that the modem is currently set for. The Modem is then ready to communicate with the network (step 710).

It is to be noticed that steps 707 to 709 have been differentiated for the purpose of clarity, but it will be obvious that the LRT, BEASD, and BEBIP signals could be parallel inputs to a (not described) 3 way logical gate, the output of which could, for example, start an interrupt process in the modem's internal processor, thus making the functional speed decision process even more embedded in the apparatus otherwise necessary to implement the above described method.

Although the invention has been described in a preferred embodiment where the data communication equipment interfacing between user's data processing equipment and the network has been called a 'modem', it will be obvious for the man skilled in the art that the invention can also be implemented in conjunction with data processing equipment, rack-mounted or embedded modems (as opposed to 'standalone modems'), or any kind of DCE hooked to any network, providing this network complies with some requirements, as stated in the very first part of the above detailed description.

What is claimed is:

1. In a Data Circuit Terminating Equipment (DCE) interfacing between a user's data processing equipment and a data communication network, a method for automatic functional speed setting of said DCE, according to a data communication rate at the DCE-network attachment point, said communication rate being imposed by said communication network upon a request of said user within a range of predefined communication rates, said method being characterized in that it includes the steps of:

a) setting said DCE functional speed according to the highest possible rate within said range of predefined rates (step 701), and b) for said set DCE functional speed, checking (steps 702, 707, 708, 709) DCE internal signals detecting any mismatch between said communication rate and said set DCE functional speed, and c1) if said checking is fully satisfactory, leaving said DCE in operational mode at said functional speed (step 710), or c2) if said checking is not fully satisfactory, setting said DCE functional speed according to the next possible lower rate within said range of predefined rates (step 704), and repeating said method from step b) above.

2. The method for automatic functional speed setting of said DCE, according to either claim 1, characterized in that it includes the step of:

if all rates within said range of predefined rates have been tried (step 703) without said checking being satisfactory, displaying a status on DCE front panel (step 705), and leaving said DCE in non-operational mode (step 706).

3. The method for automatic functional speed setting of said DCE, according to either claim 1 or claim 2, said DCE network attachment point including a receive line for carrying data in the network to DCE direction, on which three-level signals can be found according to a bipolar code, said three-level signals allowing for the generation of a square pulse train DCE internal signal, each square pulse corresponding to each one of the positive or negative signals detected on the receive line (FIG. 3), said checking of DCE internal signals detecting any mismatch between said communication rate and said set DCE functional speed including:

checking DCE internal signals for detecting presence of energy on the receive line (step 702), said checking being characterized in that it also comprises:

checking DCE internal signals for detecting a lack of generated square pulses within a given first time (step 707), and checking DCE internal signals for detecting the presence of a first number of too short or too large square pulses, within a given second time (step 708), and checking DCE internal signals for detecting the presence of a second number of bipolar code violations on said receive line, within a given third time (step 709).

4. The method for automatic functional speed setting of said DCE, according to claim 1, characterized in that said method is initiated at each power-on of said DCE.

5. An apparatus allowing for automatic functional speed setting of a Data Circuit Terminating Equipment DCE, including:

means for activating a DCE internal signal as long as Serial #07/719,431 energy is perceived on a receive line (FIG. 2), and means for generating a first square pulse train DCE internal signal, each square pulse of said first pulse train corresponding to each one of the positive or negative signals detected on the receive line (FIG. 3), and means for generating a second square pulse train DCE internal signal, each square pulse of said second pulse train corresponding to each one of either the too short or too wide detected square pulses of said first pulse train, said apparatus being characterized in that it also comprises:

means for activating a first DCE internal signal as soon as a lack of generated pulses of said first square pulse train within a given first time, has been detected (FIG. 4), and means for activating a second DCE internal signal as soon as a first number of generated pulses of said second square pulse train, has been reached within a second given time (FIG. 5), and means for activating a third DCE internal signal as soon as a second number of bipolar code violations on said receive line has been counted within a given third time (FIG. 6).

6. The apparatus according to claim 5, further characterized in that it comprises:

means for handling said first, second and third DCE internal signals and awakening a DCE internal processor whenever one of said first, second or third DCE internal signals is activated.

* * * * *

UNITED STATES PATENT AND TRADEMARK OFFICE
CERTIFICATE OF CORRECTION

PATENT NO. : 5,247,546

DATED : September 21, 1993

INVENTOR(S) : Jean-Claude Abbiate, Lucien Quenel

It is certified that error appears in the above-identified patent and that said Letters Patent is hereby corrected as shown below:

Claim 5, Line 29 delete, "Serial #07/719,431".

Signed and Sealed this

Second Day of August, 1994

Attest:

BRUCE LEHMAN

*Attesting Officer*  *Commissioner of Patents and Trademarks*